United States Patent [19]

Koester et al.

[11] 3,782,789
[45] Jan. 1, 1974

[54] TILTABLE BEARING, ESPECIALLY FOR BRIDGES

[75] Inventors: Waldemar Koester, Forsbach, Germany; Reinhold Huber, Rorbas, Switzerland

[73] Assignee: Kober AG, Glarus, Switzerland

[22] Filed: Dec. 21, 1971

[21] Appl. No.: 210,493

[30] Foreign Application Priority Data
Dec. 24, 1970 Germany ............... P 20 63 746.1
Mar. 25, 1971 Germany ............... P 21 14 391.9

[52] U.S. Cl. .................................. 308/3 R, 14/16
[51] Int. Cl. ........................................... F16c 27/06
[58] Field of Search ............. 308/3 R; 277/188; 14/16

[56] References Cited
UNITED STATES PATENTS
3,491,392  1/1970  Waller ........................... 14/16
2,386,873  10/1945  Mercier ........................ 277/188
3,094,337  6/1963  Pippert et al. .................. 277/188
3,521,893  7/1970  Josephson ..................... 277/188

FOREIGN PATENTS OR APPLICATIONS
206,777  8/1966  Sweden ........................ 14/16
1,202,813  10/1965  Germany ..................... 14/16

*Primary Examiner*—Al Lawrence Smith
*Assistant Examiner*—Barry Grossman
*Attorney*—Wolfgang G. Fasse

[57] ABSTRACT

The present tiltable bearing for heavy structures such as bridges has a load supporting piston which extends into a space confining pot into which is inserted a yielding pressure material, such as a rubber cushion, on which the piston rests. For preventing the escape of the cushion material through the gap between the outer piston walls and the inner walls of the pot, there is provided a sealing body of material which is more rigid than the cushion material. The sealing body faces said gap and forms an integral structure with the gap.

7 Claims, 5 Drawing Figures

TILTABLE BEARING, ESPECIALLY FOR BRIDGES

BACKGROUND OF THE INVENTION

The invention relates to tiltable bearings, especially for bridges or similar supporting structures wherein a piston is inserted into a preferably cylindrical pot or housing to rest on a cushion of yielding pressure material such as rubber. Such bearings usually include at least one sealing body arranged in front of the gap between the pison and the inner surface of the housing wall. The sealing body is made of a material having a greater strength or rigidity than that of the cushion.

In a known tiltable bearing of this type the gap between the piston an the inner surface of the housing is sealed by a sealing ring which is made of a synthetic material having a low coefficient of friction and which is embedded in the cushion or pressure material in the manner of a piston ring. Due to such piston ring-like construction of the sealing ring, abrasive wear and tear occurs between the sealing ring and the cushion. Another drawback of this prior art bearing is seen in that during the production of the sealing ring and cushion tolerances for fitting these parts together must be observed. See German Patent Publication DAS No. 1 202 813.

Another disadvantage of this known arrangement is seen in the wear and tear to which the cushion is subjected especially around its circumference. Due to the tilting movements transmitted to the pressure cushion the latter is subjected to compressions and expansions whereby especially the circumferential surface of the softer pressure cushion material is subject to said wear and tear which is of an abrasive nature.

OBJECTS OF THE INVENTION

The invention aims at achieving the following objects:

to overcome or alleviate the above mentioned drawbacks, especially to reduce the abrasive wear and tear;

to simplify the production of the sealing body and cushion;

to provide a tiltable bearing, the parts of which can easily be manufactured and assembled;

to provide a tiltable bearing in which abrasive wear and tear between the sealing body and the pressure cushion is avoided; and to substantially avoid abrasive wear and tear, especially along the circumferential surface of the pressure cushion.

SUMMARY OF THE INVENTION

According to the invention there is provided a tiltable bearing, especially for bridges or similar supporting structures, having a piston extending into a housing having a bottom and side walls with the gap between the piston and said side walls of the housing, said piston being supported on a pressure cushion of yielding material confined between the housing and the piston, said bearing including at least one sealing body adjacent to said gap, wherein said sealing body is made of a material which is more rigid than the pressure material, and wherein the sealing body and the pressure cushion form an integral structure.

The cushion and sealing body may be produced initially as a one piece structure whereby the differences in the material characteristics between the cushion proper and the sealing body may be produced by an after treatment or after treatment steps. However, it is also possible to first produce the cushion and the sealing body as separate elements and to them unite these elements with each other, for example by gluing or welding. Furthermore, one element may be produced first while the other is then formed onto the first element during its production, for example by vulcanization.

Uniting the sealing body and cushion in accordance with the present invention, makes it unnecessary to observe production tolerances for fitting these elements together. Also the assembly is simplified since it is no longer necessary to insert the sealing ring into a groove in the pressure cushion.

BRIEF FIGURE DESCRIPTION

In order that the invention may be clearly understood, it will now be described, by way of example, with reference to the accompanying drawings, wherein.

DESCRIPTION OF EXAMPLE EMBODIMENTS OF THE INVENTION

Figure 1:
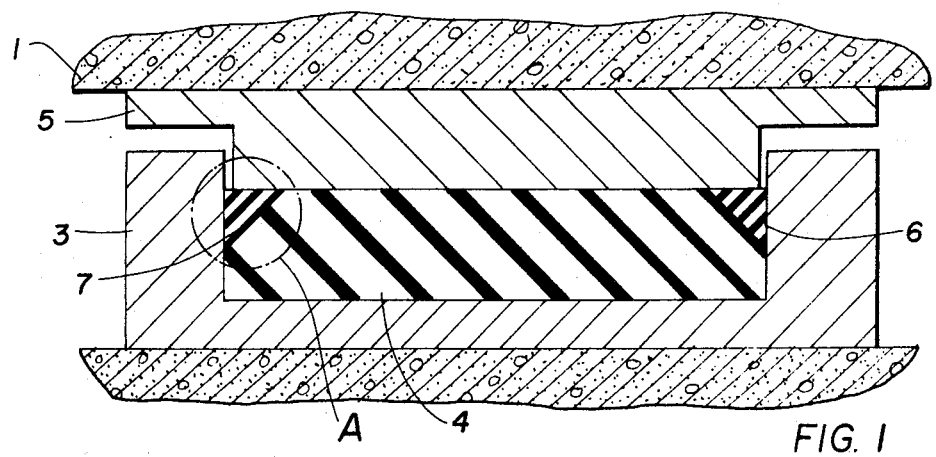
FIG. 1 is a cross section through a tiltable bearing with a corner sealing body, in accordance with the present invention, wherein the corner sealing body or ring has a triangular cross section.

The tiltable bearing shown in FIG. 1 comprises a housing or pot 3, preferably of cylindrical shape, arranged to rest on a supporting structure 2, such as a concrete foundation and to support a bridge member 1 through a piston 5 inserted into the housing 3 and resting on a pressure material forming a pressure cushion 4 made of an elastically or plastically yielding pressure mass, such as rubber or plastics material, enclosed within pot 3. The pressure cushion 4 is compressed by the piston 5 which extends partly into pot 3. In order to prevent the escape of the pressure mass through the gap between the piston 5 and the pot 3 an annular sealing body 6 is embedded in the pressure cushion which seals the gap and which is united with the pressure cushion to form a unitary, one-piece or integral structure. As shown, the sealing body 6 forms the upper circumferential corner of the pressure cushion 4 extending all around the pressure cushion.

The material of the sealing body 6 must be such that it maintains its shape in front of the gap to be sealed. Moreover, it has to be sufficiently elastic to follow the expansion movements of the bearing elements as well as take up the displacements or shifting occuring during tilting. In addition, it should yield to the pressure of the pressure mass of the cushion to the extent that the sealing body closely engages the adjacent portions of housing 3 and of the piston 5.

A pressure cushion of the invention including a one-piece sealing body may preferably be manufactured as follows:

a. a strip of a rubber mass capable of developing a greater Shore hardness than the pressure cushion itself, is placed into the bottom corner of a mold for the rubber cushion to form a ring;

b. then the remainder of the mold is filled with a rubber mass capable of developing a lower Shore hardness than said ring;

c. the entire content of the mold is then vulcanized;

d. after removal from the mold, a unitary pressure cushion is obtained the rim of which forms a sealing body with the necessary hardness for sealing the gap and the remainder of which is softer.

Instead of producing the two different degrees of hardness between the cushion proper and the sealing ring, it is also possible to let the hardness of the sealing body change in several steps, preferably gradually toward the hardness of the material of the pressure cushion. Stated differently, the sealing ring hardness may diminish gradually from its outer surface toward the pressure cushion.

As an alternative possibility, the bonding between the material of the sealing body and the material of the pressure cushion may also be accomplished by gluing, for example by a rubber cement.

The above statements regarding the embodiment shown in FIG. 1 also apply correspondingly to the other embodiments described herein.

It is to be understood that although in FIG. 1 the side or face 7, forming the transition from the rim or corner zone to the soft pressure cushion is plane, it may be curved, for example it may be convex or concave. This transition face may also have a rectangular or trapezoidal cross section.

Figure 2:
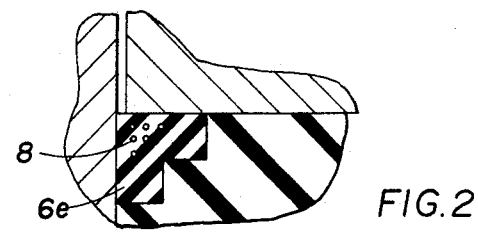
FIG. 2 is a partial cross section through a tiltable bearing similar to that of FIG. 1, wherein the sealing ring has a modified cross sectional shape.

FIG. 2 shows a cross section through another embodiment of the rim or corner zone of a pressure cushion. More specifically, the cross section of FIG. 2 shows on a somewhat enlarged scale, as compared to FIG. 1, a portion corresponding about to the portion encircled by a dash-dotted line "A" in FIG. 1. In FIG. 2, the sealing body in the corner zone of the pressure cushion in front of the gap has an angular cross section. A reinforcement means may preferably be employed directly in the corner region of the sealing body. Thus, for example, wires 8 of metal or synthetic material are embedded in the sealing body to provide said reinforcement. These wires preferably extend all around inside the sealing body. A single reinforcing wire ring or the like may also be embedded in the corner area of the sealing body.

If the pressure cushion and the sealing body are made of different materials, the materials will be selected so as to assure a very intimate and solid or strong bond between the two materials of the sealing body and cushion. It is desirable that the two materials enter into a latice-like polymerization in the transitional zone between the sealing body and the pressure cushion. This transitional zone is not sharply delimited since the polymerization forms three dimensional chain links of the interconnected materials due to the immediate union of molecule chains reacting with each other.

Figure 3:
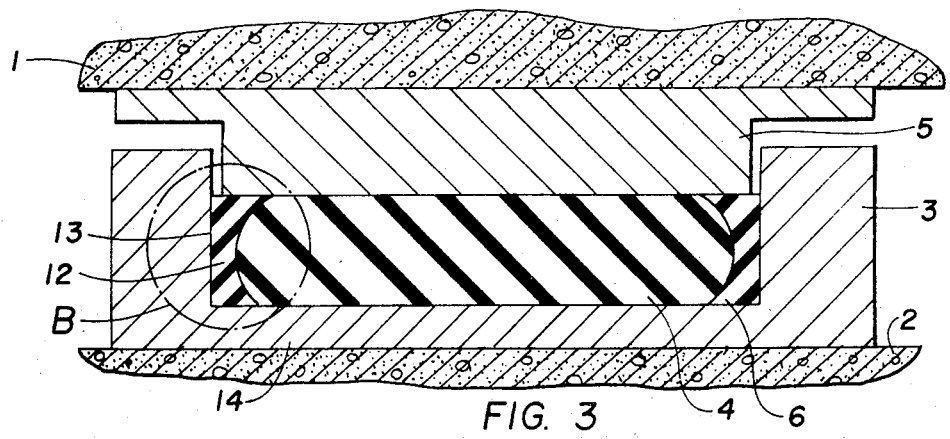
FIG. 3 is a cross section similar to that of FIG. 1, wherein the sealing body envelopes the peripheral surface of the pressure cushion.

Another embodiment of the invention is shown in FIG. 3, wherein the sealing body 6 is formed as an envelope 12 covering substantially the entire circumferential surface of the pressure cushion 4. Since the envelope 12 is made of a stronger or more rigid material as compared to that of the pressure cushion, abrasive wear and tear is effectively prevented. In selecting the material for the envelope, care should be taken that it not only will maintain its shape with respect to the gap to be sealed but that it also has a good sliding property relative to the inner wall of the housing 3. In addition, the material of the envelope 12 has to be at least vertically elastically deformable in order not to impede the tilting movement within the permissable limits, besides, the envelope material must be resistant to abrasion. As in the other embodiments, the advantage is again that wear and tear between pressure cushion and the envelope are eliminated due to the present integral structure.

The sealing body in the form of a casing or envelope for the pressure cushion may also have many different shapes. A very good bond between the casing or envelope and the pressure cushion is obtained by broadening the envelope along the bottom of the housing or by providing the casing with teeth along the side facing the softer pressure cushion. Especially good pressure conditions result when the casing has a concave inner shape which encircles a respective convex outer circumference of the pressure cushion as shown in FIG. 3. However, other cross sectional shapes of the envelope may be selected and serve efficiently for sealing the gap between the piston and the housing. Thus, the envelope may have a U-shaped, serrated, meandering (FIG. 4) or similar configuration.

Referring more particularly to FIG. 3, the sealing envelope 12 for the pressure cushion 4 extends substantially along the inner circumferential surface 13 of the housing 3. The top and bottom region of the envelope 12 is wider opposite the gap to be sealed and at the bottom 14 of housing 3 than the remainder of the envelope. This improves the sealing function of the casing or envelope and prevents that the softer mass of the pressure cushion 4 comes into contact with the inner surface of the housing 3. In FIG. 3, the enveloping sealing body 12 has a concave inwardly facing surface whereby its cross section has a shape somewhat as a sickle. As mentioned above, other cross sectional shapes may be used, for instance a rectangular shape.

The selected cross sectional shape of the sealing body depends in part on the strength of the bond between the sealing body material and the pressure cushion material.

Figure 4:
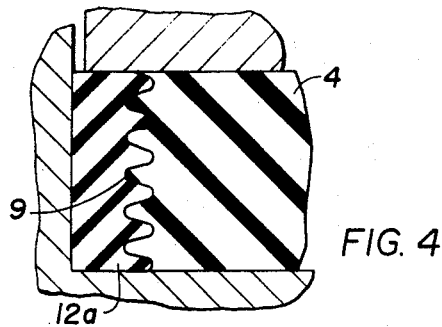
FIG. 4 is a partial cross section through a tiltable bearing similar to that of FIG. 3, wherein a modified sealing body envelopes the peripheral surface of the pressure cushion.
Figure 5:
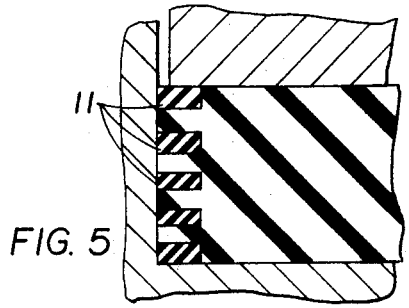
FIG. 5 is a partial cross-section through a tiltable bearing with sealing rings inserted into peripheral regions of the pressure cushion.

FIGS. 4 and 5 show modifications of the tiltable bearing of FIG. 3 which differ from the latter in the configuration of the sealing body. FIGS. 4 and 5 show on a somewhat enlarged scale a portion corresponding to that encircled in FIG. 3 by a dash-dotted line "B." More specifically, in FIG. 4, the face 9 of the sealing body 12a which faces the softer pressure cushion 4 is wavy or meandering. As mentioned above, other shapes could be used, for the sealing body, thus it could be serrated, U-shaped or stepped.

Referring to FIG. 5, this embodiment comprises a plurality of sealing rings 11 embedded in the circumference of the pressure cushion 4 spaced at intervals from each other and having a ring shape. This embodiment also prevents substantially abrasive wear of the pressure cushion at its circumference since the harder material of the rings 11 supports the softer pressure cushion material between the rings 11, though the cushion may contact the inner surface 13 of the housing 3 between the rings 11, however, this is not an intimate contact because the sealing rings 11 of harder material resting against the inner surface 13 prevent such a contact and thus limit the wear of the pressure cushion.

Referring further to FIG. 5, it is within the present teaching that the rings 11 of the sealing body may form a spiral embedded in the pressure cushion, whereby the spiral preferably forms at each of its ends a closed ring resting on one side against the inner surface of the bottom 14 of the housing 3.

The one piece or integral structure of one or more sealing bodies with the pressure cushion may be obtained as mentioned, by an after-treatment of a pressure material which prior to such treatment was one and the same material for the cushion proper and the sealing ring. Such after-treatment may, for example, involve a localized vulcanization if the starting material is, for instance, synthetic rubber, whereby localized regions of greater Shore hardness may be obtained for the sealing ring areas as compared to the Shore hardness of material of the pressure cushion.

As briefly indicated above, the pressure cushion and sealing bodies may, however, also be made of different materials and may be interconnected by gluing or by an intimate bond such as is obtained, for instance, by vulcanizing or welding. Material combinations which are capable of entering into an interlace bond or polymerization with each other or otherwise enter into an intimate bond may be used successfully such as synthetic materials, plastics, rubber, "Neoprene," "Vulkollan" or synthetic materials having similar properties. Catalysts or glues may be used to accelerate the hardening of the synthetic material to assure said bond between the two materials along the interface thereof.

In view of the foregoing it is to be understood that the invention comprises all modifications and equivalents within the scope of the appended claims.

What is claimed is:

1. In a tiltable bearing wherein a supporting piston rests with its bottom surface on a yielding cushion of pressure material in a housing, wherein a gap is formed between a circumferential piston surface and an inner circumferential surface of the housing walls, wherein sealing means are located between the pressure material and said gap, said yielding cushion and said sealing means forming an integral structure, said sealing means having a mechanical strength larger than that of said pressure material of the yielding cushion, the improvement wherein said yielding cushion has a top and bottom surface and a circumferential ring surface interconnecting said top and bottom surfaces, said sealing means forming a continuous ring zone which covers the entire circumferential ring surface of the yielding cushion, said continuous ring zone having said larger mechanical strength, said continuous ring zone providing a good sliding property relative to the inner wall of the housing, and means for initially bonding said mechanically stronger ring zone to the entire circumferential ring surface of said cushion whereby said ring zone substantially insulates the yielding movements of said cushion from said inner housing walls while simultaneously providing reduced friction between the ring zone and said inner housing walls.

2. The tiltable bearing according to claim 1, wherein said ring zone has a concave inner surface intimately bonded to the ring surface of the yielding cushion.

3. The tiltable bearing according to claim 1, wherein said ring zone has a corrugated inner surface which grips into a respective corrugation of the circumferential ring surface of the cushion.

4. The tiltable bearing according to claim 1, wherein the sealing ring zone is of the same material as the yielding cushion.

5. The tiltable bearing according to claim 1, wherein the means for intimately bonding comprise glue or a vulcanized or a welded interface between the cushion and the sealing ring zone.

6. The tiltable bearing according to claim 1, wherein the sealing means and the yielding cushion are made of different materials capable of intimately bonding to each other.

7. The tiltable bearing according to claim 1, wherein the sealing means and the yielding cushion are made of materials of the natural or synthetic rubber type.

* * * * *